United States Patent Office.

JULES HENRI LAVOLLAY AND GUSTAVE EUGÈNE BOURGOIN, OF PARIS, FRANCE.

PROCESS OF AMELIORATING AND PASTEURIZATING FERMENTED LIQUIDS AND BEVERAGES.

SPECIFICATION forming part of Letters Patent No. 666,535, dated January 22, 1901.

Application filed July 10, 1900. Serial No. 23,093. (No specimens.)

*To all whom it may concern:*

Be it known that we, JULES HENRI LAVOLLAY, chemical engineer, and GUSTAVE EUGÈNE BOURGOIN, mechanical engineer, of 3 Rue Froment, Paris, in the Republic of France, have invented a new Process of Ameliorating and Pasteurizating Fermented Liquids and Beverages, of which the following is a specification.

This invention relates to a new process for sterilizing beverages and all kinds of fermented liquids.

After completion of fermentation and when beverages are exposed to the light and air it frequently happens that they spoil, owing to the presence of ferments or germs of a noxious nature, either before or after the racking process.

The present process has for its object the avoidance of these difficulties, at the same time improving the product.

Our process consists in subjecting the fermented liquids to the combined action of electricity and of a suspended alkaline-earth-metal manganate or other insoluble manganate.

In carrying out our process we add to the worts a small quantity of, say, calcium manganate, varying from twenty to one hundred grams per hectoliter of worts, according to the nature of the latter. The worts are treated cold, the manganate being kept in suspension in the liquid while a current of from one to five amperes per square meter is passed through the mass for from five to ten minutes. The above latitude is given in the amounts and times to provide for the different natures of liquids in various cases. After this treatment the liquid may be allowed to settle and is then ready to rack.

The advantages derived from the use of this process are: complete and rapid decantation, bettering of the flavor of the product, and the destruction of strange or parasitic germs or ferments, thus insuring preservation of the liquid.

What we claim is—

1. The method of rendering insoluble manganates efficient for the bettering and sterilizing of fermented beverages which consists in reducing the insoluble manganate to a powder, maintaining the same in suspension in the beverage to be treated and in passing an electric current through said beverage during such suspension.

2. The method of bettering and sterilizing beverages which consists in maintaining in suspension in the cold beverage a powdered alkaline-earth-metal manganate and simultaneously subjecting said beverage and manganate to the action of an electric current.

In witness whereof we have hereunto signed our names, this 23d day of June, 1900, in the presence of two subscribing witnesses.

JULES HENRI LAVOLLAY.
GUSTAVE EUGÈNE BOURGOIN.

Witnesses:
AUGUSTE TOURNOL,
PAUL TOURNOL.